United States Patent [19]

Hatch

[11] Patent Number: 4,978,986
[45] Date of Patent: Dec. 18, 1990

[54] CAMERA ACCESSORIES FOR CONTRAST CONTROL

[76] Inventor: McGlachlin Hatch, 1803 Ivy Oak Sq., Reston, Va. 27090

[21] Appl. No.: 472,798

[22] Filed: Jan. 31, 1990

[51] Int. Cl.⁵ .............................................. G03B 11/00
[52] U.S. Cl. ................................... 354/295; 350/315; 350/318; 354/126; 362/18
[58] Field of Search ........... 354/202, 295, 126, 145.1; 352/45; 350/315, 318, 316; 362/16, 17, 18, 15

[56] References Cited

U.S. PATENT DOCUMENTS

| | | | |
|---|---|---|---|
| 3,994,008 | 11/1976 | Land et al. | 354/295 |
| 4,302,078 | 11/1981 | Stravitz | 350/318 |
| 4,687,312 | 8/1987 | Navarro | 354/295 |
| 4,901,098 | 2/1990 | Salles | 354/295 |

Primary Examiner—A. A. Mathews

[57] ABSTRACT

Camera accessories, mountable on lenses or flash units, for altering contrast between dark and light areas of photographs. A camera accessory includes framing plates for holding a polarized filter carrier which is rotatable in front of a camera lens or flash unit while a second polarized filter is linearly moveable over part or all of the front of the lens or flash unit. With the lens accessory, the second polarized filter can be positioned to cover one area of the picture while the first polarized filter and camera exposure controls are manipulated to alter lighting ratios. With a flash accessory, the two polarizers can be used as a variable density filter for increased flexibility in the use of flash photography to increase or decrease contrast between areas of highlights and shadows.

4 Claims, 2 Drawing Sheets

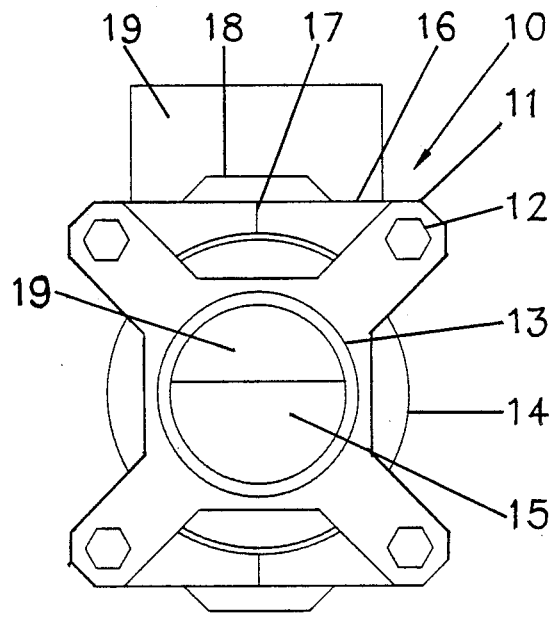
FIG. 1
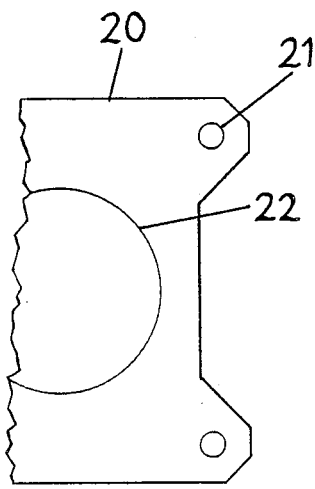
FIG. 2
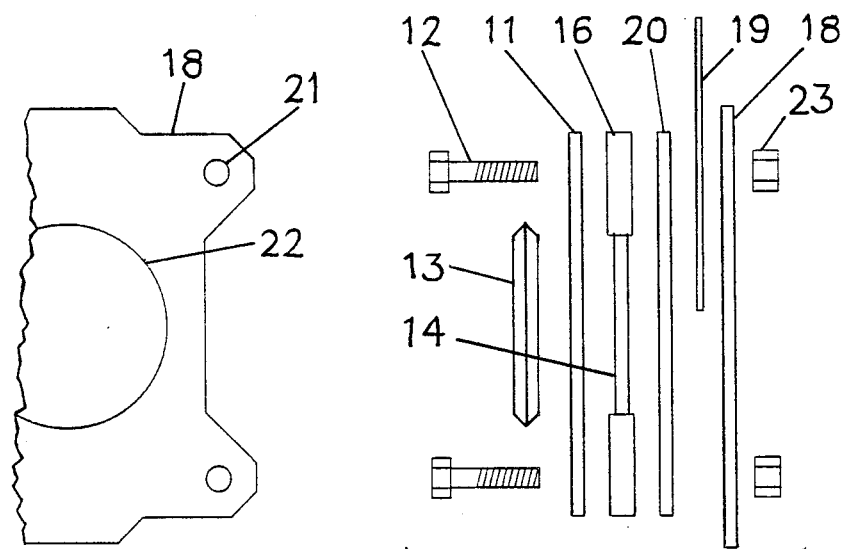
FIG. 3
FIG. 4

CAMERA ACCESSORIES FOR CONTRAST CONTROL

BACKGROUND OF THE INVENTION

This invention relates to camera lens and flash accessories, employing polarized filters, for controlling lightness ratios, or contrast, between two or more areas of a photograph.

The invention comprises camera accessories with which a polarized filter can be held and rotated in front of a camera lens or flash unit while a second polarized filter is moved linearly over part or all of the front of the lens or flash unit.

The invention offers practical assistance to photographers faced with three basic problems:

(a) With distant objects, such as landscapes and sunsets, one area of the scene often is so much brighter than the other that both cannot be properly recorded on film.

(b) With near objects, such as flowers and birds, sunlight often causes harsh shadows; the lack of sunlight often results in flat, featureless pictures.

(c) With near pictures, including flowers, movement of the subject often causes blurred pictures.

The problem with distant pictures is discussed in many books and articles. For example, the following comments are found on page 204 of "The New Joy of Photography" by the editors of Kodak: "The light in a landscape varies tremendously in brightness. The supremely sensitive human eye adjusts instantaneously for these extreme conditions. But photographic film is sometimes incapable of recording both shadows and highlights". This problem has been partially solved in four ways:

(a) Kodak's editors suggest that "you may have to expose for one and sacrifice the other. More often you will want to determine an intermediate exposure by taking a close-up reading of a middle value in the scene or by metering both light and dark areas and splitting the difference." This is good advice in the absence of other methods. The fact is, however, that sacrificing one area or averaging frequently results in land areas that are too dark or sky areas that are too light. Averaged photographs can be printed darker or lighter, but this is just another way of sacrificing one or the other.

(b) It is common practice to use a polarized filter to darken blue skies. This is an effective technique, but the darkening effect decreases rapidly as the camera is turned away from a 90° angle between sun and object. It is ineffective in the cases of pictures toward or away from the sun and in the absence of blue skies.

(c) Darkroom techniques known as "dodging and burning" can be used, during printing, to decrease the apparent contrast between dark and light areas of a photograph. many photographers, however, do not have easy access to darkrooms and do not want to pay for custom printing services. In any event, these techniques do not provide negatives for reproduction unless the added expense of producing new negatives from prints is accepted.

(d) The sky in a landscape picture can be darkened with a "graduated filter", meaning that half of the filter is colored to diminish transmitted light and the other half is clear. The "Cokin" filter system offers a number of colors, including two neutral gray filters of different densities. These filters are effective but they have certain disadvantages: they are expensive, they cannot be cut to fit the contour between land and sky, they are difficult to see within a camera's viewing system, they offer limited density variations, and they must be replaced for changes in density.

The problems with near pictures also are discussed in available literature. For example, in the aforementioned book on pages 140 and 142, Kodak's editors discuss the problems of contrast between areas of highlights and shadows. On page 194, they discuss the problem of blurred pictures due to subject movement. In the first case they suggest the use of light reflectors; in the second, they suggest the use of wind baffles. In both cases they suggest the use of flash units for fill-lighting or main-lighting, as well as for "freezing" moving object. In some cases, they suggest the use of diffusing materials, such as tissue or cloth, to reduce flash output.

These are useful techniques for selecting lens apertures, shutter speeds and flash distances. Frequently, however, the flash-to- subject distances are not convenient. Without assistants or special equipment, the photographer is handicapped unless the flash unit can be located at or near the camera. Some flexibility is provided by flash units with variable outputs but they are expensive and offer a limited range of f-stops. Expedient diffusers are useful, but they must be used based on trial-and-error tests and they do not add much flexibility.

SUMMARY OF THE INVENTION

This invention takes advantage of the well-known fact that a polarized filter absorbs light vibrating in certain planes (roughly 60–70% of the total). Practically all of the light passing through the filter will pass through a second polarizer placed in the same alignment. As one of the polarizers is rotated, additional light is absorbed until virtually all light is is absorbed at an angle of 90°. The amount of light transmitted through both filters, at different angles, can be conveniently calibrated in f-stops. It follows that the two filters can be held in a framing device and used with a camera lens or flash unit as a variable-density filter. Calibration of the two-filter combination can be accomplished with the help of light meters or by use of Malus's law which indicates that light passing through is equal to the square of the cosine of the angle between the two polarizers. At an angle of 45°, 50% of the light is transmitted.

One of the polarized filters can be shifted within the framing device to cover a portion of the face of a camera lens or flash unit. The other polarizer can then be rotated to vary the amount of light passing through the partially covered portion. With a through-the-lens viewing system, the photographer can turn the rotatable filter to or near 90° so that the dividing line between two picture areas is clearly visible. In sequence, the linearly movable filter can be accurately positioned and the rotatable filter can then be turned to an indicated degree of light absorption measured in f-stops. In this manner the lighting ratio can be shifted incrementally from 1:1 to 1:32 or more.

It is an objective of this invention to provide camera accessories which take advantage of the characteristics of polarized filters. It is a further objective to provide these accessories at such low cost and simplicity that they will be valuable to the serious amateur photographer of modest means as well as the professional.

There are two preferred embodiments of the invention. One is an accessory for attachment to a camera lens. The second is an accessory for attachment to a camera flash unit—but adaptable for use with a lens. As will be seen, the two variations provide low-cost, easily operated accessories.

The lens accessory includes a framework of three thin plates adjustably connected at the four corners and with a round through window. Connected to the camera by a ring mount, the three plates provide two compartments: one to hold a rotatable polarized filter carrier and one to hold a linearly adjustable filter. The plates are shaped to expose the filter carrier for easy finger manipulation and visual selection of f-stop positions. Advantages of the lens accessory are summarized as follows:

(a) A scene can be observed through a viewfinder, at the selected lens aperture, while the rotatable filter is turned to a "dark" position. The other filter then can be observed and moved to a position separating two areas of the picture. The photographer can then manipulate shutter speeds and filter f-stops to achieve desired lighting ratios. The photographer's technique of "bracketing" can be applied to both areas.

(b) The linearly moved polarizer, made of thin plastic, can be cut to fit the line of demarkation between two areas of a picture. Other cuts can be made and colored filters can be added for special effects.

(c) The accessory can be used as a variable density filter, enabling the photographer to shift to slower shutter speeds for deliberatly blurred pictures and for enhanced flash photography capabilities.

(d) Retail prices for materials for a lens accessory total less than $10, satisfying the objective of low cost.

The flash accessory is similar to the lens accessory except that it includes a rectangular window to match the shape of a flash unit. Advantages of the flash accessory are summarised as follows:

(a) The photographer is no longer limited to three variables (aperture, shutter speed and flash distance). With both filter accessories in use, the photographer can decrease light entering the lens and light output of the flash, both measured in f-stops. Aided by simple charts or formulas (adjusted for flash power and film speed), the photographer has greater latitude in taking flash pictures in daylight and in reducing flash distances for flash-fill and ambient-fill exposures.

(b) The photographer has more accurate control of the contrast between highlight and shadow areas of a picture. The most useful goals are to: take a full flash exposure plus ¼ or ⅛ of a full ambient picture, or take a full ambient exposure plus ¼ or ⅛ of a full flash exposure. These amounts of over-exposure are consistent with Kodak's advice for color negative film. For color slide film, the basic exposure can be reduced ½ stop, resulting in acceptable under-exposure.

(c) Opportunities for taking flash pictures in daylight are increased because shutter speeds can be reduced. This means that moving objects can be "frozen". In addition, backgrounds can be darkened, frequently with good results.

(d) The flash accessory is less expensive than the lens accessory because the ring mount is replaced by a cheaper attaching device and because polarized filters used and damaged in the lens accessory can be used in the flash accessory.

Both accessories have enhanced capabilities with cameras with shutter-flash synchronization at speeds faster than 1/60th or 1/125th of a second. These include more expensive 35 mm cameras, such as the Olympus OM-4T, and many of the larger format cameras.

Similarly, capabilities are enhanced with more powerful flash units. Some of these units have more than one power setting, but they are expensive and offer fewer power gradations than the flash accessory described above.

DESCRIPTION OF THE DRAWINGS

FIG. 1 is a frontal view of a camera accessory adapted for attachment to a camera lens.

FIG. 2 is a partial frontal view of the middle plate of the accessory shown in FIG. 1.

FIG. 3 is a partial frontal view of the rear plate of the accessory shown in FIG. 1.

FIG. 4 is an exploded side view of the accessory shown in FIG. 1.

DESCRIPTION OF THE INVENTION

Figure 5:
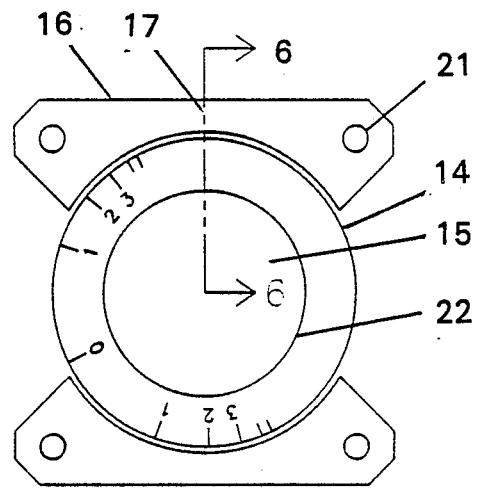
FIG. 5 is a frontal view of a filter carrier and its guide pieces.

FIG. 1 shows an assembled lens accessory 10 with a front plate 11 to which other elements of the accessory are fastened by connecting bolts 12. A coupling ring 13, with male threads on both sides, is screwed into front plate 11, providing for attachment to a camera lens. Behind front plate 11 is a round filter carrier 14 which holds a first polarized filter 15. Filter carrier 14 is held in place by guide pieces 16 which are located immediately behind front plate 11. Front plate 11 is cut away on all four sides to permit visual registration of filter carrier 14 with respect to base lines 17 on guide pieces 16. A rear plate 18 protrudes slightly to facilitate the insertion of a second polarized filter 19.

FIG. 2 shows a middle plate 20, which is hidden in FIG. 1. Middle plate 20 is located behind guide pieces 16, holding them in place. Bolt holes 21 are provided for connecting bolts 12. A round window 22 is provided for the transmittal of light into the camera lens.

FIG. 3 shows that rear plate 18 is identical to middle plate 20 except for a projection to facilitate the insertion of second polarized filter 19.

The exploded side view in FIG. 4 shows how the elements of the accessory are assembled and held together by connecting bolts 12 and nuts 23. Filter carrier 14 and guide pieces 16 are positioned between front plate 11 and middle plate 20. Second polarized filter 19 is held by friction between middle plate 20 and rear plate 18.

Filter carrier 14 and its guide pieces 16 are shown in FIG. 5. Filter carrier 14 is calibrated in f-stops.

Figure 6:
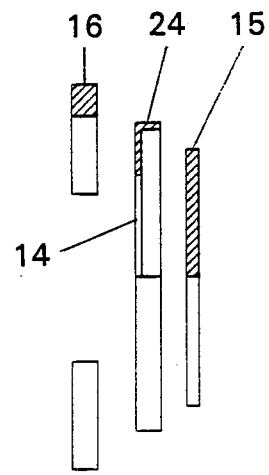
FIG. 6 is an exploded, partially sectionalized view of the elements shown in FIG. 5.

A side view of FIG. 5 is shown in FIG. 6, exploded and partially sectionalized along the line indicated by the numerals 6—6 in FIG. 5. This view shows that filter carrier 14 is a disc with a flanged edge 24, providing a recess for first polarized filter 15. First polarized filter 15 is glued or taped to filter carrier 14 so that it can be replaced when worn or damaged.

Figure 7:
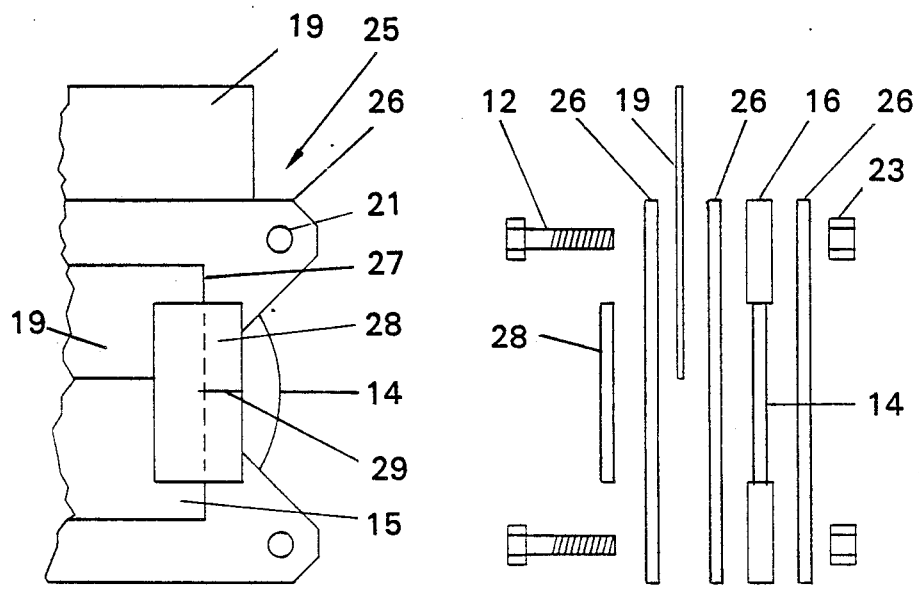
FIG. 7 is a frontal view of a camera accessory adapted for attachment to a camera flash unit.
Figure 8:
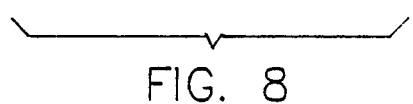
FIG. 8 is an exploded side view of the accessory shown in FIG. 7.

An assembled flash accessory 25 is shown in FIGS. 7 and 8. It is similar to lens accessory 10 shown in FIGS. 1-6, except that all three plates 26 are indenticle and include a rectangular window 27. Self-adhering fabric fasteners 28, as sold under the name of "Velcro", provide a practical method of attachment to a flash unit.

Guide marks 29 are provided on fabric fasteners 28 to permit registration of filter carrier 14. Filter carrier 14 is positioned between middle and rear plates 26 so that it will not rub against the face of the flash unit.

Referring back to FIG. 1, a variety of materials can be used for plates 11, 18 and 20. A practical sheet material is used to make wastebaskets, particularly by Rubbermaid. This material is tough, pliable, workable, inexpensive and non-abrasive when in contact with second polarized filter 19.

Coupling ring 13 is described as a separate unit with male threads on both sides. It could be cast as an integral part of front plate 11, and it could provide a snap-on mount rather than a screw mount. It also could be freely rotatable in the manner of filter holders commonly used for polarized filters.

Filter carrier 14 can be adapted from one of the plastic tops of containers found in the food and cosmetic sections of retail stores. In such case, the top should be pared back to reduce flanged edge 24 and the thickness of guide piecs 16.

Guide pieces 16 can be made of plastic, wood or other low-cost material. They must be thick enough to permit free movement of filter carrier 14. As with coupling ring 13, guide pieces 16 can be cast as integral parts of front plate 11.

Polarized filters 15 and 19 can be cut from sheets of material available at about 12 cents per square inch (about $1.50 for each of the filters of the invention). Samples which have been used successfully include "Pola-Glare" material of the Da-Lite Screen Company of Cincinnati, Ohio, and two products of The Polaroid Corporation: a "linear" polarizer HN38 and a "circular" polarizer HNCP37. The metering systems of some cameras (such as the Pentax LX and SF1) are not compatible with linear filters and require circular filters. Otherwise, linear filters are easier to use because circular filters must be held in correct face-to-face position. In either case, minimum thickness is preferred to reduce the chance of reflections from the cut edge of second polarized filter 19. To reduce the possibility of reflections within the camera lens, anti-reflective coating of the filter material would be useful; but only one sample has been available and it did not perform properly as a variable density filter.

OPERATION OF THE INVENTION

The preferred embodiment of the invention, generally shown in FIGS. 1 and 4, is lens accessory 10. It is a practical tool for photographers reasonably familiar with the manual operation of cameras with through-the-lens viewing. The following steps are appropriate for the most significant subject matter (landscapes, seascapes, sunrises and sunsets).

(a) Mount the camera on the tripod for best results, although the accessory can be used with a monopod or without support.

(b) Using coupling ring 13, mount lens accessory 10 on the camera lens, insuring that it is free to rotate in both directions.

(c) Avoiding direct observation of the sun, tilt the camera up and down to obtain meter readings of bright and dark areas. Exposure controls then should be set for the darker area or for the average of the two readings.

(d) Insert second polarized filter 19 between middle plate 20 and rear plate 18, using care not to mar the filter's surface.

(e) Compose the desired picture, bearing in mind an appropriate dividing line between two areas to be subjected to changes in lighting ratio.

(f) Turn filter carrier 14 to a dark position (3 or more f-stops) and lower second polarized filter 19 until it is clearly visible in the viewfinder.

(g) Depress the camera's preview button (if necessary for viewing at the selected aperture) and position second polarized filter 19 at the selected dividing line.

(h) If the exposure is set for the darker area, filter carrier 14 can be turned and pictures taken at different f-stops, usually starting at 1 f-stop and ending at the f-stop equal to the metered difference in brightness. For important pictures, the photographer might bracket the initial exposure settings and try filter settings between the full f-stop positions.

(i) If the initial exposure is set at an average of two meter readings, it is best to increase exposure of the dark area by decreasing shutter speeds while decreasing exposure of the bright area by turning filter carrier 14. Because shutter speed affects the entire picture area, filter carrier 14 should be turned 2 f-stops for a one-stop change in shutter speed. Changes in aperture can be made, but only if the filter alignment is rechecked.

Polarized filter 19 can be removed and cut to fit an irregular dividing line between dark and light areas of a picture. Practically, it is best to cut a piece of cardboard (such as a playing card) for use as a template. This procedure requires awareness that the "picture window" at the plane of second polarized filter 19 varies with changes in focal length or aperture. In most cases, the straight edge of second polarized filter 19 can be used. Frequently, a position within the "dark" area can be selected, prehaps darkening a line of trees or causing a false shadow.

There are other uses for camera lens accessory 10 which would be apparent to a skilled photographer. For example:

(a) If a building is part in sunlight and part in shade, it can be photographed to equalize or more nearly equalize the brightness of the two areas. In the same manner, city scenes which are part in sunlight and part in shadow can be properly recorded.

(b) Second polarized filter 19 can be used to cover the picture area, resulting in a variable density filter. The photographer can then increase filter f-stops in order to decrease shutter speeds. Decreased shutter speeds can be used to record moving objects in "blurred" motion or to facilitate flash photographs in daylight to "freeze" motion.

(c) Second polarized filter 19 can be cut to provide "windows" of various sizes and shapes—say to darken the area around a portrait. Vertical cuts can be made in second polarized filter 19 to simulate light rays in the sky or, used horizontally, to simulate shadows across a landscape.

(d) Special color effects can be obtained with colored polarized filter material or by using colored transparencies along with neutral polarizers.

(e) An additional plate (or plates) can be added to rear plate 18 to hold colored filters or one or more additional polarizers (cut at angles to selectively reduce light transmission).

(f) Lens accessory 10 can be used as a flash accessory, but not as effectively as the second embodiment of the invention discussed below (because the flash unit has a rectangular rather than round) face).

Flash accessory 25, shown in FIGS. 5 and 6, is most useful for freezing near objects (such as birds and butterflies) and for increasing or decreasing the contrast between highligts and shadows. In this case, polarized filter 19 is inserted to cover all of rectangular window 26. Filter carrier 14 then can be manipulated to decrease flash output in measured amounts. Advice to the photographer would include:

(a) The purpose, in this context, is to take two pictures at the same time: one a fully exposed ambient picture along with an underexposed flash picture or a fully exposed flash picture along with an underexposed ambient picture. Normally, the fully exposed picture would be taken with light directed at an angle while the underexposed picture would be aligned with the camera lens.

(b) For an ambient picture, the flash unit should be moved 2 or 3 stops away from the objective (either in distance or rotation of filter carrier 14. For a flash picture, the camera's shutter speed should be set at 2 or 3 stops faster than the measured exposure. In both cases, exposures can be bracketed by moving the flash unit or by turning filter carrier 14.

(c) The applicable variables are: both ambient and flash pictures are affected by film speed, lens aperture and lens filters; flash pictures are uniquely affected by the flash unit's power, flash filters and flash distances; ambient pictures are uniquely affected by shutter speed. Shutter speed, of course, must be set at or below the maximum flash-shutter synchronization speed for the camera.

(d) The flash unit's scale of distances (as related to aperture) must be shifted to lower values of about 3/2 stops when flash accessory 25 is used and another 3/2 stops when lens accessory 10 is used. Shifts to lower values occur with lower film speeds and to higher values with faster film speeds.

(e) Flexibility of flash accessory 25 increases with increased flash power and with increased flash-shutter synchronization speeds.

Operating instructions for the photographer can be provided in the form of charts and formulas (derived from the fact that light intensity decreases by a factor of 4 when distance is increased by a factor of 2).

(a) A photographer might wish to take flower pictures with ISO 100 film and a flash unit with an ASA guide #80—with an aperture of f16 and flash distance of 36". For an ambient picture plus ¼ flash (A+¼F), filter carrier 14 should be set at 2 steps. For ½ Flash (A+½F), filter carrier 14 should be set at 3 stops. Flash pictures can be taken with filter carrier 14 set at 0 and the shutter set at 2 or 3 stops faster than the speed suggested by the meter (F+¼A or F+½A).

(b) More elaborate formulas or charts can be provided to include a wide range of apertures and flash distances. For example, a simple chart can be made for ambient pictures plus ¼ flash (A+¼F) using the following data for different filter carrier 14 f-stops: 5=f11 and 18" or f8 and 25"; 4=f16 and 18", f11 and 25" or f8 and 36"; 3=f22 and 18", f16 and 25", f11 and 36" or f8 and 50"; 2=f22 and 25", f16 and 36", f11 and 50"" or f8 and 72"; 1=f22 and 36", f16 and 50" or f11 and 72"; and 0=f22 and 50" or f16 and 72".

Flash accessory 25 can be used in other ways. It can for example, be attached to a rectangular filter holder and then used in the manner described for lens accessory 10. It also can be used as a "split-field" filter with the flash unit, providing for two or more variations in flash output. With second polarized filter 19 cut so that it covers the bottom or top (or both) of the face of the flash unit, overexposure of foreground object can be avoided.

From the foregoing descriptions and explanation, it is evident that the invention offers significant help to photographers faced with the problems of too much or too little lighting contrast in distant pictures. It also helps in the improvement of near pictures both in improved contrast and in freezing moving objects.

The above descriptions should not be construed as limiting the scope of the invention. The scope of the invention should be determined by the claims.

The invention claimed is:

1. A camera accessory for altering contrast between dark and light areas of photographs, comprising:
   a. a frame comprising front, middle and rear plates for holding freely rotatable and linearly movable polarized filters in front of a camera lens or flash unit;
   b. said frame having connecting means at four corners for easy assembly and for frictionally holding said linearly movable polarized filters;
   c. guide means, positioned by said connecting means, for separating two of said plates and for containing a round filter carrier;
   d. said filter carrier having a diameter of about twice the diameter of said lens, or twice the width of the face of said flash unit, and having a flanged edge for cooperation with said guide means and for providing a recess for said rotatable polarized filter;
   e. windows for the passage of light through said plates and said filter carrier;
   f. said frame having at least one side cut back nearly to said windows, to prominently expose said filter carrier for observation and easy manipulation;
   g. said filter carrier having calibration marks, preferably in f-stops, for alignment with base marks on said frame or guide means;
   h. attachment means for removably connecting said frame to said lens or said flash unit; and
   i. one or more of said linearly movable polarized filters inserted from any of four directions and frictionally held between two of said plates.

2. The camera accessory of claim 1 wherein:
   a. said connecting means comprises nuts and bolts; and
   b. said guide means comprises two plates, each slightly thicker than the width of the flange of said filter carrier, each connected between two of said bolts, and each having an inwardly facing concave edge for cooperation with said filter carrier.

3. The camera accessory of claim 2 wherein:
   a. said front plate is cut away on all four sides to further expose said filter carrier;
   b. said windows are round to agree with the shape of said camera lens; and
   c. said attachment means comprises external threads at the window of said front plate for mating with said lens or internal threads for acceptance of an adapter compatible with said lens.

4. The camera accessory of claim 2 wherein:
   a. said windows are round through said filter carrier and rectangular through said frame to agree with the shape of said flash unit; and
   b. said attachment means comprises self-adhering fabric attached to said frame and said flash unit.

* * * * *